United States Patent
Medeau et al.

(10) Patent No.: US 12,429,104 B2
(45) Date of Patent: Sep. 30, 2025

(54) KINETIC ENERGY ABSORPTIVE COMPOSITE ARTICLE

(71) Applicant: ROLLS-ROYCE plc, London (GB)

(72) Inventors: Victor P A Medeau, London (GB); Silvestre T Pinho, London (GB); Lorenzo Mencattelli, London (GB); Emile S Greenhalgh, London (GB); Soraia Pimenta, London (GB); MohammadErfan Kazemi, London (GB); James A Finlayson, Ashby-de-la-Zouch (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 18/670,836

(22) Filed: May 22, 2024

(65) Prior Publication Data
US 2024/0392855 A1 Nov. 28, 2024

(30) Foreign Application Priority Data
May 26, 2023 (GB) ...................... 2307925

(51) Int. Cl.
*F16F 7/00* (2006.01)
*F01D 5/28* (2006.01)

(52) U.S. Cl.
CPC .............. *F16F 7/003* (2013.01); *F01D 5/282* (2013.01); *F05D 2220/32* (2013.01);
(Continued)

(58) Field of Classification Search
CPC .............. F16F 7/003; F16F 2224/0241; F16F 2230/0023; F01D 5/282; F01D 5/147; F01D 21/04; F01D 21/045
See application file for complete search history.

(56) References Cited

U.S. PATENT DOCUMENTS 4,871,598 A * 10/1989 Potente .............. B65D 88/1612
220/900
6,048,426 A * 4/2000 Pratt ........................ B32B 5/26
156/324

(Continued)

FOREIGN PATENT DOCUMENTS

EP 3705282 A1 9/2020
GB 2485758 A 5/2012

OTHER PUBLICATIONS

Mencattelli, L et al, Bio-Inspired design for enhanced damage tolerance of self-reinforced polypropylene/carbo fibre polypropylene hybrid composite, DOI: 10.1016/j.compositesa.2019.03.028, Jun. 1, 2019, ScienceDirect.

(Continued)

*Primary Examiner* — J. Todd Newton (57) ABSTRACT

A kinetic energy absorptive composite article comprising a plurality of plies, and a method of manufacturing the kinetic energy absorptive composite article. Each ply comprises a plurality of substantially parallel fibers encapsulated within a resin. A plurality of localised weaknesses are comprised within the fibers of the kinetic energy absorptive composite article, the locations of the plurality of localised weaknesses forming a pre-defined pattern. The pre-defined pattern comprises a first sub-pattern and a second sub-pattern superposed upon the first sub-pattern. The first sub-pattern is configured so that a crack formed by an impact event propagates substantially along a predetermined fracture path to separate the kinetic energy absorptive composite article into at least a first portion and a second portion and the second sub-pattern is configured to set a threshold below which the crack does not propagate.

15 Claims, 8 Drawing Sheets

(52) U.S. Cl.
CPC ...... *F05D 2230/90* (2013.01); *F05D 2260/96* (2013.01); *F05D 2300/603* (2013.01); *F16F 2224/0241* (2013.01); *F16F 2230/0023* (2013.01)

(56) References Cited

U.S. PATENT DOCUMENTS

| | | | | |
|---|---|---|---|---|
| 8,647,072 | B2 | 2/2014 | McMillan | |
| 10,974,480 | B2* | 4/2021 | Wilenski | B32B 5/26 |
| 10,994,514 | B2* | 5/2021 | Wilenski | B32B 7/03 |
| 2007/0293108 | A1* | 12/2007 | Kubota | B32B 27/34 |
| | | | | 427/532 |
| 2014/0227479 | A1* | 8/2014 | Kismarton | B32B 5/26 |
| | | | | 428/113 |
| 2017/0144818 | A1* | 5/2017 | Wilenski | B64D 37/32 |
| 2017/0226867 | A1* | 8/2017 | Nandula | F02C 3/06 |
| 2017/0370376 | A1 | 12/2017 | Kray et al. | |
| 2019/0263088 | A1* | 8/2019 | Wilenski | F16F 7/12 |
| 2019/0263091 | A1* | 8/2019 | Wilenski | B32B 7/04 |
| 2020/0061961 | A1* | 2/2020 | Wilenski | B29C 70/20 |
| 2020/0116027 | A1 | 4/2020 | Jain et al. | |
| 2020/0171790 | A1* | 6/2020 | Wilenski | B29C 70/202 |
| 2023/0003132 | A1 | 1/2023 | Jain et al. | |

OTHER PUBLICATIONS

Great Britain search report dated Nov. 27, 2023, issued in GB Patent Application No. 2307925.4.

Mencattelli, L. et al, Bio inspired design for enhanced damage tolerance of self-reinforced polypropylene/carbon fibre polypropylene hybrid composites.

European search report dated Oct. 22, 2024, issued in EP Patent Application No. 24173264.3.

* cited by examiner

KINETIC ENERGY ABSORPTIVE COMPOSITE ARTICLE

CROSS-REFERENCE TO RELATED APPLICATIONS

This specification is based upon and claims the benefit of priority from United Kingdom patent application GB 2307925.4 filed on May 26, 2023, the entire contents of which is incorporated herein by reference.

BACKGROUND

Technical Field

The present disclosure concerns a kinetic energy absorptive composite article that if it fails in use it will fail in a safe and controlled manner.

For example, the kinetic energy absorptive composite article may be a gas turbine engine composite fan blade that if it is damaged by a bird strike will fail in a controlled manner such that the fan blade or any portion thereof will remain located within the engine and the impact energy will be safely dissipated.

Description of the Related Art

Gas turbine engines used for aerospace propulsion are typically designed for safe operation if a bird strikes one of the fan blades with sufficient force to cause the fan blade, or a portion thereof, to break off the fan.

To enable such safe operation, gas turbine engines typically comprise fan containment systems that surround the fan blades of the fan. These systems are often heavy, with the mass of the fan containment system correlating to the kinetic energy of the released fan blade or portion of fan blade that is to be contained.

It is desirable to reduce the mass of such a fan containment system to improve aircraft fuel consumption, whilst maintaining the level of protection provided by the fan containment system.

This would be made easier, if it could be ensured that the maximum size of a fan blade or portion of a fan blade released following a bird impact were smaller than that assumed for existing designs. However, this is difficult, as the desire for improved fuel efficiency provides a motivation for an increasing the diameter of fan blades for a gas turbine engine thrust.

There is therefore a desire to provide a kinetic energy absorptive composite article, e.g. in the form of a gas turbine engine fan blade, that addresses at least some of these problems or at least provides a useful alternative to known kinetic energy absorptive composite articles.

SUMMARY

In a first aspect, there is provided a kinetic energy absorptive composite article. The kinetic energy absorptive composite article comprises a plurality of plies. Each ply comprises a plurality of substantially parallel fibers and a resin encapsulating the plurality of fibers. A plurality of localised weaknesses are comprised within the fibers, the locations of the plurality of localised weaknesses forming a pre-defined pattern. The pre-defined pattern comprises a first sub-pattern and a second sub-pattern superposed upon the first sub-pattern. The first sub-pattern is configured so that a crack formed by an impact event propagates substantially along a pre-determined fracture path to separate the kinetic energy absorptive composite article into at least a first portion and a second portion. The second sub-pattern is configured to set a threshold below which the crack does not propagate.

In a second aspect, there is provided a gas turbine engine that includes a kinetic energy absorptive composite article of the first aspect.

In a third aspect, there is provided a method for manufacturing a kinetic energy absorptive composite article that will fail in a controlled manner upon impact, the method comprising the steps of laying up a ply and introducing at least one localised weakness to the ply in dependence upon a record of the required location of the at least one localised weakness.

Although the principles outlined in the following disclosure are disclosed in relation to a kinetic energy absorptive composite article in the form of a fan blade of a gas turbine engine, it will be readily appreciated that the principles disclosed herein are also applicable to other forms of kinetic energy absorptive composite article in other industrial applications.

For example, the principle of providing a kinetic energy absorptive composite article that is configured to fracture along a pre-defined surface once an impact threshold is exceeded may also be incorporated in other applications, in which a body or exterior body panel of vehicle comprises a composite structure.

By predefining the fracture threshold and surface, the body or exterior panel of the vehicle may fracture in a controlled manner. This may ease repair of the body or exterior panel, as repair pieces, of a known shape, may be prepared and made available for vehicle repair, following the vehicle being involved in an accident.

This is advantageous because the method disclosed herein mitigates against the propagation of a crack in an uncontrolled and unspecified direction, which would otherwise complicate the repair to the vehicle.

Within this document, the term "localised weakness" defines a feature that is deliberately introduced within a composite ply to promote failure of the composite laminate at or in proximity of the localised weakness. A localised weakness, as so defined, may therefore be distinguished from a weakness within a composite structure arising from manufacturing variability of the laminate or the components (fiber, resin) from which the composite laminate is manufactured.

Within this document, the term "alternative release plane" is defined as a plane that separates a released portion of a fan blade from a retained portion of the fan blade under Fan Blade Off (FBO) conditions, the alternative release plane being radially-outboard of a retaining means used to retain a composite fan blade 31 by a feature of a fan disc and radially outboard of an annulus line formed by an intersection of a surface of the fan blade and the exterior profile of a fan spinner. In this context, an alternative release plane is differentiated from a conventional release plane, as a conventional release plane is at or inboard of the annulus line.

Throughout this specification and in the claims that follow, unless the context requires otherwise, the word "comprise" or variations such as "comprises" and "comprising", will be understood to imply the inclusion of a stated integer or group of integers but not the exclusion of any other stated integer or group of integers.

DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying Figures. Further aspects and embodiments will be apparent to those skilled in the art.

Figure 1:
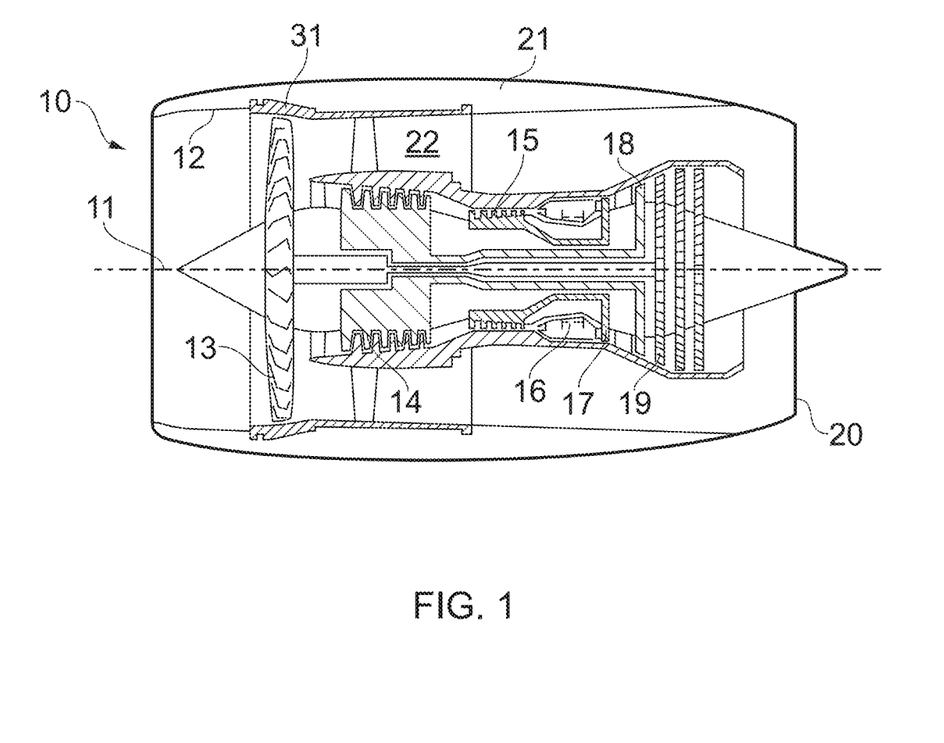
FIG. 1 is a sectional side view of a gas turbine engine that has a fan that has composite fan blades.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

It will be appreciated that in addition to normal operation, the gas turbine engine 10 may be designed to safely accommodate certain identified engine failure scenarios. Indeed, the ability of the gas turbine engine 10 to accommodate certain identified failure scenarios, may be mandatory if the gas turbine engine 10 is to be cleared by a certification authority such as the European Union Aviation Safety Authority (EASA) or Federal Aviation Authority (FAA), for transporting passengers.

One such engine failure scenario is a Fan Blade Off (FBO) event, in which a fan blade breaks into at least two portions, with at least one outermost portion of the at least one fan blade 31 of fan 13 released, and an inner portion of the at least one fan blade, comprising the root of the fan blade, retained by its fan blade root with the fan disc.

Once released, the released portion of the at least one fan blade impacts components of the fan case 32 surrounding the fan 13. The components impacted may form a fan containment system, as they are configured to contain the portion of the at least one fan blade 31 following its release. The fan containment system may be any form of fan containment system. For example, the fan containment system may comprise an aramid composite, such as a composite comprising Kevlar®, that is repeatedly wrapped around an outer perimeter of a fan case that surrounds fan 13.

In some engine fan blade off events, a portion from a single fan blade 31 may be released.

Alternatively or additionally, in some fan blade off events, a portion from a plurality of fan blades 31 may be released. For example, release of a portion from a first fan blade 31 may cause the release of a portion from a second fan blade 31 that is adjacent to the first fan blade, if the released portion of the first fan blade 31 impacts the second fan blade 31 during the Fan Blade Off event. In these scenarios, the second fan blade may be referred to as a trailing blade as it trails (follows) the first fan blade 31, when account is made for the direction of rotation of the fan 13 and fan blades 31.

It is known that the kinetic energy possessed by a released portion of a fan blade (for example, first fan blade 31, second fan blade 31) correlates to the mass of the released portion and the square of the rotational speed of the fan 13 at the time at which the portion of the fan blade 31 is released.

It is also known that the mass of the fan containment system therefore also correlates to the mass of the released portion of the fan blade 31 that is to be contained by the fan containment system.

As the fan containment system is radially outboard of the fan 13, the fan containment system may have a large radius and be relatively heavy. However, the fan containment system provides no functional benefit for the gas turbine engine 10, other than during a fan blade off event, which is a statistically unlikely event. Thus, an aircraft propelled by the gas turbine engine 10 carries mass (the mass of the fan containment system) to mitigate against the effect of an event which may never occur during the operational lifetime of a specific aircraft.

Reducing the mass of the released portion of the first fan blade 31, or second fan blade 31 is therefore desirable, as it permits the mass of the fan containment system to be reduced. This provides a benefit to an aircraft to which the gas turbine engine 10 is fitted, as the mass of the aircraft, comprising the at least one gas turbine engine 10 is reduced. This reduces the fuel consumption of the aircraft and may permit the aircraft to carry an additional passenger or passengers, increasing the revenue for an airline that operates the aircraft.

The mass of the fan blade or portion of the fan blade released during a fan blade off event also directly influences the magnitude of out of balance forcing caused by the continued rotation of a fan 13 that has shed a blade or portion of a fan blade.

The ability of a gas turbine engine 10 to tolerate continued out of balance forcing following a Fan Blade Off event may also be required, as the fan 13 may continue to rotate for several hours once an engine 10 has been shut down, due to the forward speed of an aircraft on which the engine is mounted and the fact that the aircraft may be several hours flying time away from an airport at the time at which the fan blade off event occurs. This may be the case, if for example, the aircraft is crossing an ocean at the time at which the fan blade off event occurs.

Reducing the mass of the released portion of fan blade 31 may therefore have the additional benefit that it may also permit lighter-weight structural features to be incorporated within the engine, leading to further savings in total engine mass.

Reducing the mass of the released portion is therefore desirable.

Progress in reducing the mass of the released portion has been made by the adoption of lower density, composite fan blades in place of metallic fan blades. However, further improvement remains desirable. This is particularly the case, as a desire for reduction in aircraft fuel consumption is leading to increases in gas turbine engine bypass ratio, and as a consequence, larger fan blades for the same level of gas turbine engine thrust.

Figure 2:
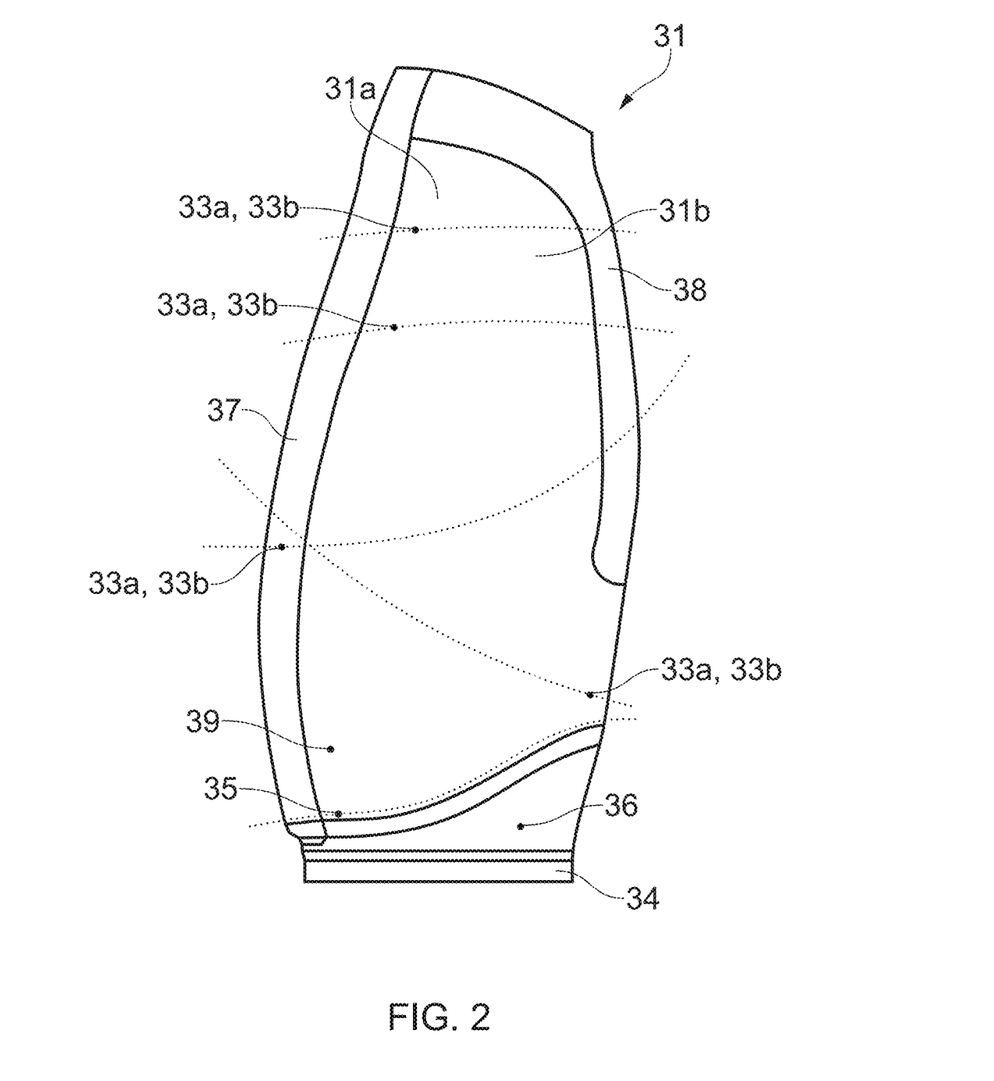
FIG. 2 is a schematic side view of a composite fan blade, illustrating potential alternative release planes.

For example, it would be desirable for separation of the fan blade into a released portion and a retained portion to occur at a mean blade height that is radially outboard of the blade height at which separation may typically be expected to occur (for example, such as along an annulus line 35—see FIG. 2). It would also be desirable for the separation surface to be substantially repeatable for the same blade geometry, such that separation along this surface may be reliably assumed during fan containment events. This surface, as it is outboard of annulus line 35, may be referred to as an alternative release plane 33*a*.

The alternative release plane 33*a* substantially corresponds to a pre-defined fracture surface 33*b*, as it defines the direction of propagation of at least one crack 40 within the fan blade 31 in a pre-defined direction. The pre-defined fracture surface 33*b* may meander about the alternative release plane 33*a*, meaning that the pre-defined fracture surface 33*b* may not be identical to the alternative release plane 33*a*.

Fracture along the pre-defined fracture surface 33*b* reduces variability in the magnitude of the released portion of a fan blade under fan blade off conditions.

Techniques for incorporating alternative release planes have been previously proposed. Examples of these techniques include changing the overall shape of the fan blade to create stress concentration, and the incorporation of ply-drops within the structure in which adjacent fiber layers ("plies") stop in different areas of the blade. However, these methods may compromise the aerodynamic shape of the blade (reducing fan efficiency and increasing fuel consumption), complicate manufacture of the fan blade or result in a reduction in the strength of the blade.

It is therefore desirable to develop an alternative approach, as is now disclosed.

FIG. 2 provides an illustration of a composite fan blade 31. A plurality of example alternative release planes 33*a* are also shown in the FIG.

In the example of FIG. 2, the composite fan blade predominantly comprises a composite laminate 39 comprising a plurality of different layers (plies) of fiber material, encapsulated within a resin. The plies may each comprise a plurality of parallel fibers with a resin to form a composite laminate 39, as is known in the art. The orientation of the fibers of adjacent, overlaying plies may be the same or different.

In the example of FIG. 2, the composite fan blade 31 additionally comprises reinforced regions, at the leading edge and trailing edge of the blade. The reinforced regions (comprising fan blade leading edge reinforcement 37 and fan blade trailing edge reinforcement 38) may be reinforced by a metallic shield over the leading edge or trailing edge of the composite portion of the fan blade 31.

Not all composite fan blades 31 may comprise metallic reinforcement at the leading edge and/or trailing edge.

The composite fan blade 31 of FIG. 2 is an example of a kinetic energy absorptive composite article 31.

As is apparent from FIG. 2, an alternative release plane 33*a* (i.e., corresponding to a pre-defined fracture surface 33*b*) within a co-ordinate system, such as a cartesian co-ordinate system or a cylindrical polar co-ordinate system, may extend in two dimensions (for example, constant in a radial direction) or may extend in three dimensions.

It will be appreciated that when a composite fan blade rotates within a running gas turbine engine, the fan rotating about axis 11, aerodynamic forces act on the fan blade to deform its shape. For example, the blade may be twisted about an axis that is substantially perpendicular to rotational axis 11. This deformation creates strain within the material of the fan blade, storing energy.

Similarly, when a fan blade is impacted by a foreign body such as a bird, further deformation of the blade may occur. This further increases strain within the material of the fan blade 31, storing further energy. Following impact, the blade may no longer be in an equilibrium state, and may therefore respond and/or oscillate.

The blade may respond and/or oscillate in a modal shape or superposition of a plurality of modal shapes. The at least one modal shape may define areas of the blade with greater strain and/or displacement.

The at least one modal shape may have a frequency of oscillation.

When, following impact, the fan blade 31 responds and/or oscillates with a modal shape, localised areas of higher strain and higher stress may be created or accentuated within the fan blade, relative to the stress and strains within the fan blade prior to impact (equilibrium conditions).

The modal shape of the fan blade, and the stresses and strains within the fan blade may be simulated by numerical analytical techniques such as finite element analysis. Thus, it is possible to predict the likely behaviour of the fan blade under impact conditions. This may be beneficial during the design of the arrangement of plies that form the composite blade.

Although the composite material from which the gas turbine engine fan blade 31 is made is stiff and can sustain high loads, if the local strain capability of the composite fibers and/or interface between composite fibers and resin is exceeded, localised breakage of the composite fiber and/or composite resin in which the composite fiber is encompassed, may occur, forming a crack 40. Forming the crack 40 releases stored strain energy within the vicinity of the tip of the crack, due to a reduction in strain proximal to the tip of the crack 40.

If the energy released by the failure of the composite material is greater than the energy subsequently required to cause further material to fail, the crack will propagate.

If the crack propagates, the crack propagates in a direction to reduce the elastic energy (strain energy) stored within the fan blade.

If the energy required to cause the material to fail is greater than the energy released by failure, then the crack will not propagate.

Thus, knowledge of the modal shape of the response of the fan blade and the localised stresses and strains within the fan blade may enable the direction of propagation of the crack within the composite fan blade to be predicted.

Variations in at least one of the impact location, impact energy, and/or composition of the composite laminate due to manufacturing variability may influence the direction of crack propagation.

As previously disclosed, it is possible to model the response of the fan blade 31 under impact conditions. This modelling may also demonstrate that variations in impact location, impact energy, and/or composite of the composite laminate due to manufacturing variability may alter the direction of crack propagation, and therefore, may alter the shape and/or mass of the released radially outer portion 31a of fan blade 31.

To successfully implement a fan blade containment strategy that relies upon an alternative release plane 33a, it is necessary to ensure that the portion of the fan blade 31 that is released during a Fan Blade Off event, is no larger (i.e., no heavier) than the size of the portion of the fan blade that is outboard of the alternative release plane 33a—i.e., it is necessary to be able to accommodate variation in impact location and or manufacturing and retain the same release plane.

Figure 3:
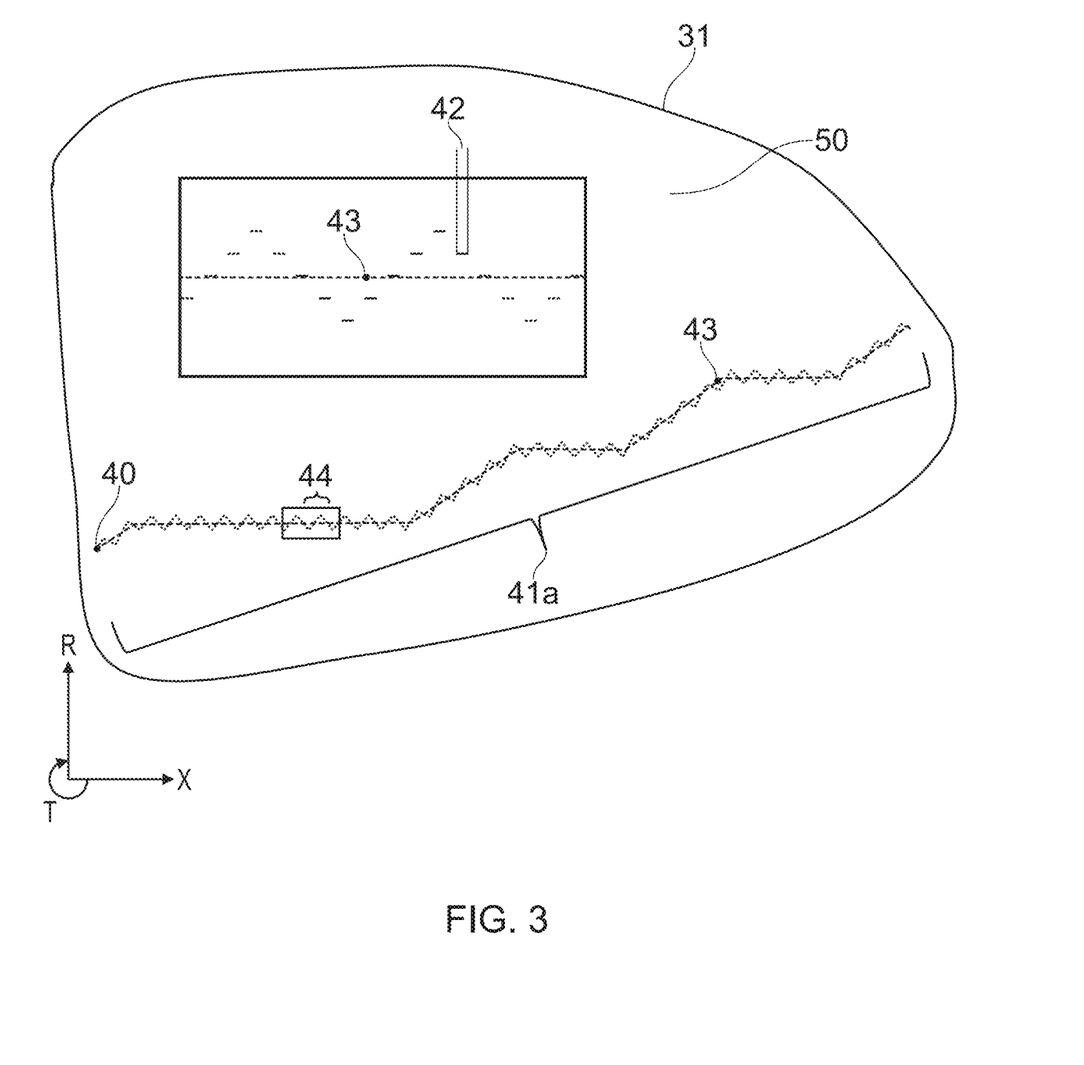
FIG. 3 is a schematic illustration of the propagation path of a crack in a ply layer of a composite fan blade.
Figure 4:
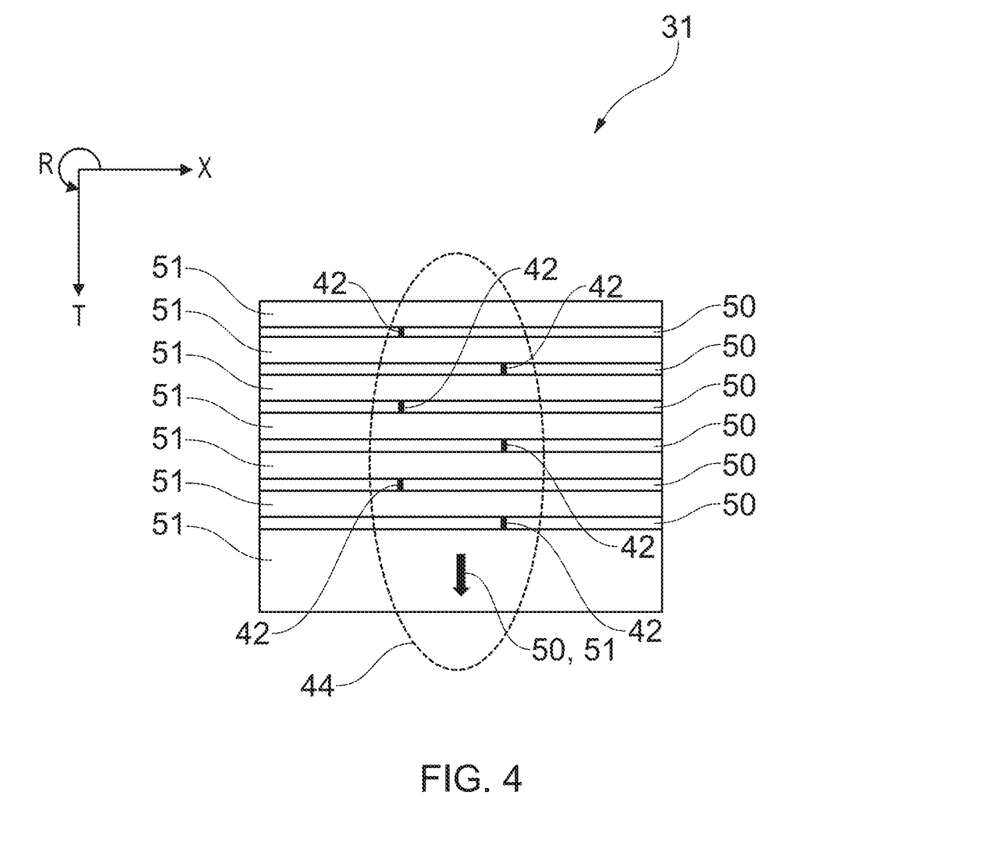
FIG. 4 provides an example illustration of the propagation pattern of a crack in a cross-section of a fan blade.

FIGS. 3 and 4 provide an illustrative example of how this variation in impact or manufacturing may be accommodated, by disclosing a pattern 41a for producing predictable crack propagation along an alternative release plane 33a corresponding to a pre-defined fracture surface 33b and avoiding the disadvantages of known alternative release plane methods such as a non-optimised aerodynamic shape, increase in blade mass or reduction in blade strength.

Other pre-defined fracture surfaces 33b, corresponding to a pre-defined patterns 41a different to those shown in FIGS. 3 and 4 may also be envisaged. For example, a pre-defined fracture surface 33b may be aligned with any one of the example alternative release planes 33a illustrated in FIG. 2.

The composite laminate, features of which are disclosed in FIGS. 3 and 4, comprises a plurality of overlaying plies comprising fibers encased within a resin. The composite laminate additionally comprises a plurality of localised weaknesses 42.

To aid orientation, both FIG. 3 and FIG. 4 are marked with a three-dimensional co-ordinate system.

In this co-ordinate system, "X" is a chordal direction, aligned along the blade at constant radius, R, "R" is aligned in a radial direction that is orthogonal to "X" and "T" is in a direction of thru-thickness of the blade. Here, "T" is orthogonal to both "R" and an exterior surface of the fan blade at which the cross-section of FIG. 4 is made. It will be appreciated that as the fan blade may be twisted (for example, to provide an aerodynamic benefit), "T" may or may not be orthogonal to "X" at a specific cross-section.

FIG. 3 is a plan view of a portion of a ply 50 in the laminate which forms the kinetic energy absorptive composite article 31 such as a fan blade 31.

The ply 50 comprises a ply pre-defined pattern 41a, lying in the plane of the ply 50. The ply pre-defined pattern 41a comprises at least one localised weakness 42.

The at least one localised weakness 42 may be formed by severing or partially severing a fiber of the ply 50, or a grouping of a plurality of fibers of the ply 50.

As the ply pre-defined pattern 41a lies in the plane of the ply 50, the ply pre-defined pattern 41a may be regarded as a two-dimensional pattern, even though the ply may be curved in cartesian space.

As is subsequently disclosed in more detail below, as the laminate which forms the kinetic energy absorptive composite article comprises a plurality of overlaying plies, the laminate which forms the kinetic energy absorptive composite article therefore comprises a plurality of overlaying ply pre-defined patterns 41a.

The summation of the plurality of two-dimensional ply pre-defined patterns 41a of the ply layers forms a pre-defined pattern 41b.

As the pre-defined pattern 41b extends across ply layers within the laminate of the kinetic energy absorptive composite article, the pre-defined pattern 41b may be regarded as a three-dimensional pattern.

FIG. 4 is a cross-sectional view through the laminate which forms the kinetic energy absorptive composite article 31.

It shows that some of the plies 50 which extend across the thickness of the kinetic energy absorptive composite article 31 comprise at least one localised weakness 42, and as a consequence, comprise a ply pre-defined pattern 41a, an example of which is illustrated in FIG. 3.

It also shows that some of the plies 51 which extend across the thickness of the fan blade 31 do not comprise at least one localised weakness 42.

Although in FIG. 4 plies 50 comprising at least one localised weakness 42 are shown interleaved with plies 51 that do not comprise at least one localised weakness 42, other overlaying arrangements of plies 50,51 are possible depending upon the nature of the desired pre-defined pattern 41b.

For example, in some embodiments, each ply within the composite laminate may comprise at least one localised weakness.

For example, in some embodiments, at least one localised weakness 42 may extend across a plurality of plies 50. By changing the size of the localised weakness (for example, by extending across a plurality of fibers within a ply and/or a plurality of fibers spanning adjacent plies), the propagation of a crack 40 within the laminate may be controlled.

Figure 5:
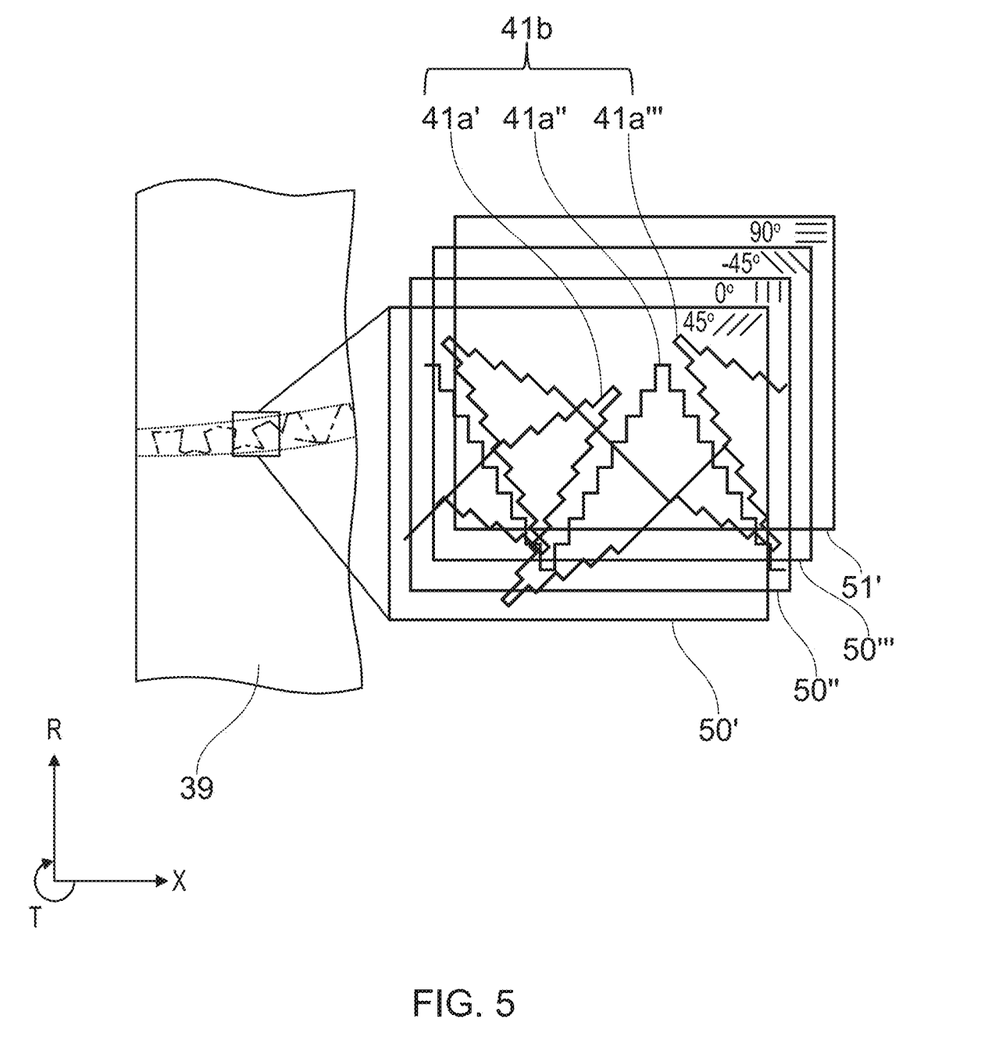
FIG. 5 provides an example illustration of the propagation pattern of a crack in a plurality of ply layers.

The nature of the pre-defined pattern 41b, and its associated crack propagation, may be further understood by reference to FIG. 5.

FIG. 5 illustrates an example arrangement of sequentially overlaying ply layers 50', 50", 50''' and 51 which form part of a laminate.

In the illustrative example of FIG. 5: Ply layer 50' overlays ply layer 50" and comprises ply pre-defined pattern 41a'; Ply layer 50" is between ply layer 50' and ply layer 50''', and comprised ply pre-defined pattern 41a"; Ply layer 50''' is between ply layers 50" and ply layer 51', and comprises ply pre-defined pattern 41a'''; and Ply layer 51' is overlaid by ply layer 50''' and does not comprise a ply pre-defined pattern.

As is known in the art, the orientation of fiber lay-up may vary between ply-layers.

For example, in the example of FIG. 5, adjacent orientations of 45°, 0°, −45°, 90° are used.

Other fiber orientations may also be used. For example, ply orientations of −60°, 0°, 60° may be used, as may helicoidal ply layups, in which the fiber orientation angle between adjacent plies is less than 30°.

It will be appreciated that as the ply pre-defined pattern 41*a* within a ply 50 is formed by at least partially severing fibers within that ply 50, the orientation of the ply pre-defined pattern 41*a* within a ply 50 is influenced by the orientation of the fibers within that ply 50.

Consequently, the orientation of overlaying ply pre-defined patterns 41*a* in overlaying plies 50, is based at least in part on the relative orientations of the overlaying plies 50.

For example, in FIG. 5, as the fibers of ply layer 50' are orientated at 45° to the fibers of ply layer 50", the orientation of pre-defined pattern 41*a*' of ply layer 50' may also be orientated at 45° to pre-defined pattern 41*a*" of ply layer 50".

A consequence of this is that when the tip of a crack 40 propagates to a localised weakness in a ply layer 50, depending upon the location of the crack tip within the laminate, the closest adjacent localised weakness 42 to the tip of the crack 40 may be within the same ply, or may alternatively be within an adjacent (overlaying or overlaid) ply. Thus, further propagation of the crack may be within the same ply layer, and/or may alternatively cross ply layers to the adjacent ply.

Therefore, by pre-defining patterns 41*a* of localised weaknesses within each ply 50 and accounting for the relative location and orientation of the ply pre-defined pattern 41*a* in that layer to the location and orientation of the ply pre-defined pattern 41*a* in adjacent ply layers, it is possible to control the propagation of a crack 40 in three-dimensions within a three-dimensional laminate (i.e., propagation within a ply, and/or propagation across ply layers).

Such an arrangement of ply pre-defined patterns 41*a* in different plies 50, with potentially different orientations between plies, makes it possible to promote cracking along a pre-determined yet complex, multifaceted fracture surface within the laminate. The complex, multifaceted fracture surface also increases the total crack surface area, increasing the energy required for the crack to propagate.

Consequently, pre-definition of the pattern 41*a* of localised weaknesses 42 within a ply 50, accounting for the location and orientation of ply pre-defined patterns 41*a* of localised weakness 42 in other (adjacent) plies 50, provides a means of not only reliably controlling the direction in which a crack 40 may propagate, but also in determining an energy threshold below which the crack 40 will not propagate. This energy threshold may be based at least in part on an impact energy of a foreign object against the laminate (for example, such as the impact of a bird against a fan blade).

In some embodiments, plies 50 comprising at least one localised weakness may be grouped together (as illustrated by plies 50', 50" and 50''' in FIG. 5), while plies 51 comprising no localised weaknesses may be grouped together. For example, plies 50 comprising at least one localised weakness 42 may be grouped to be proximal to an impact surface of the fan blade, whereas plies that do not comprise at least one localised weakness may be grouped to be proximal to a surface of a fan blade that opposes the impact surface.

It will be appreciated that other distributions of localised weaknesses are possible, within the scope of the disclosure.

Figure 6:
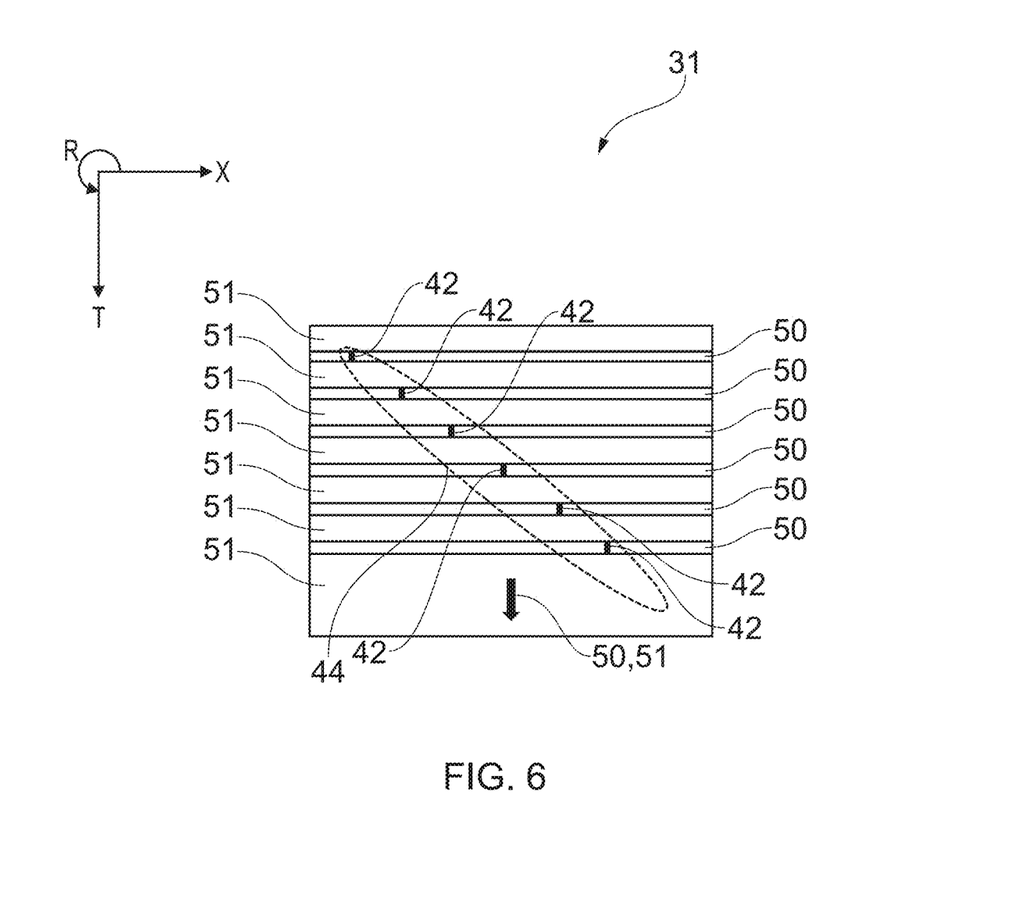
FIG. 6 provides a second example illustration of the propagation pattern of a crack in a cross-section of a fan blade.

For example, FIG. 6 provides an alternative through-thickness distribution of localised weaknesses to FIG. 4, as, while FIG. 4 shows a pattern of localised weaknesses 42 which extend in a substantially perpendicular direction through the laminate, FIG. 6 shows a pattern of localised weaknesses 42 extending along an inclined plane that is not perpendicular to the surface of fan blade 31. It would therefore be understood that whereas the pattern of FIG. 4 may promote crack propagation that is substantially perpendicular to the layers of the laminate, the pattern of FIG. 6 may promote crack propagation along the inclined plane.

The nature of the localised weaknesses 42, and the influence of their spatial distribution on crack initiation and propagation is now disclosed in more detail.

The localised weaknesses 42 may be in the form of micro localised weaknesses. That is, only a portion of a ply is weakened. For example, in a ply 50 comprising a plurality of fibers, such as parallel fibers, a localised weakness 42 may be incorporated into a single fiber of the ply layer, or a grouping of adjacent fibers of the ply layer.

The localised weakness 42 may comprise severing or partially severing a single fiber or grouping of adjacent fibers of a ply.

Severing of at least one fiber of a ply layer may occur during manufacture, between the lay-up of adjacent ply layers.

Severing may involve a cutting process, such as mechanical cutting with a blade or machine tool, or laser cutting.

Alternatively, the localised weakness may comprise a localised weakness within the resin that encapsulates the fibers of the laminate. For example, a focused laser beam may thermally-degrade the resin to form a localised weakness, without substantially affecting the fibers.

Alternatively, the localised weakness may be formed by applying a chemical to the ply.

The chemical applied may reduce the breaking strength of the fiber of the ply to which it is applied. The chemical applied may reduce the bond strength between the fiber and resin in which it is encapsulated, thereby promoting localised delamination.

Alternatively, the chemical may be applied to a portion of a ply before an adjacent ply is overlaid, thereby promotion localised delamination between the adjacent ply layers.

The chemical may be applied by a spray process. An example of the chemical is polytetrafluoroethylene (PTFE).

Incorporation of a localised weakness 42 within the laminate promotes crack propagation in the vicinity of the localised weakness 42, as the energy required to propagate the crack is reduced relative to a ply that does not incorporate a localised weakness. Thus, a crack may propagate more easily in the vicinity of a localised weakness, propagating towards the localised weakness to reduce strain energy.

Having reached a first localised weakness, a crack may propagate from the first localised weakness to an adjacent, second localised weakness, and subsequently from the second localised weakness to a third localised weakness that is adjacent to the second localised weakness, and so on.

The above mechanism is applicable to crack propagation both within a ply, and between plies.

For example, although a crack may propagate between adjacent localised weaknesses within a ply (as defined by ply pre-defined pattern 41*a*), if the energy required to propagate the crack between ply layers is lower (for example, if the closest localised weakness to the tip of the crack is in a different ply to the ply comprising the crack), the tip of the crack may progress from one ply layer to another (as defined by pre-defined pattern 41*b*).

By spatially defining and incorporating a plurality of localised weaknesses 42 throughout the fan blade 31, it is possible to guide the spatial propagation of a crack between localised weaknesses 42.

From the previous disclosure made in relation to FIGS. 3-5, it will be understood that the spatial distribution of the localised weaknesses is determined by a plurality of ply pre-defined patterns 41a which form pre-defined pattern 41b within the laminate.

The pre-defined pattern 41b therefore corresponds to a potential future fracture surface within the laminate. This fracture surface is a pre-defined fracture surface 33b, as it is to be created based upon the pre-defined pattern 41b of localised weaknesses that are incorporated within the matrix during manufacture of the laminate.

The spatial distribution of localised weaknesses 42 may be specified in the pre-defined pattern 41b such that the localised weaknesses meander about the desired alternative release plane 33a.

As the desired alternative release plane 33a substantially corresponds to the pre-defined fracture surface 33b, the mass of the released portion of the fan blade may therefore be controlled.

In addition to controlling the direction along which a crack 40 propagates, properties of the localised weaknesses 42 and/or the spatial distribution of localised weakness defined by the pre-defined pattern 41b may also be varied to control the impact capability of the fan blade.

This is desirable, because although it is required to control a path of fracture of the fan blade substantially along the alternative release plane 33a, it is also a requirement to ensure that the resulting fan blade has some degree of impact tolerance.

Setting a minimum threshold below which a crack 40 will either not initiate or will not propagate is desirable for both safety and commercial issues. This is because although airports take great efforts to scare birds away from runways, it is not possible to ensure that a fan blade 31 of a gas turbine engine 10 will never be impacted by a bird. A gas turbine engine for use in aerospace applications therefore requires some degree of tolerance to bird impact, while for commercial reasons, it is also desirable that this tolerance does not require frequent replacement or inspection of an installed set of fan blades 31 of a fan 13.

The magnitude of the energy required to propagate the crack between adjacent localised weaknesses 42 is dependent upon several factors, including the proximity (distance) of the adjacent localised weaknesses to each other, the dimensions of the adjacent localised weakness and the first localised weakness, the materials from which the composite is comprised and/or whether the weakness is formed by fully or partially severing a fiber.

For example, if the localised weaknesses 42 are small and sparsely distributed, the energy required to propagate a crack 40 is higher than if the localised weaknesses 42 are large and/or more closely distributed localised weaknesses 42.

Control of the separation of the localised weaknesses 42 via patterns 41a and 41b is important because if the localised weaknesses are very sparsely distributed, a crack may not propagate between adjacent localised weaknesses and/or may propagate along a path different to that between weaknesses.

Thus, by suitable selection of the dimensions (size) and relative location (proximity) of localised weaknesses, it is possible to control the energy threshold required to cause a crack to propagate between localised weaknesses 42. In other words, it is possible to control the toughness of the resulting article 31 comprising the localised weaknesses 42.

The spatial distribution of localised weaknesses 42 is now considered, by referring to the pred-defined pattern 41b, as disclosed by FIGS. 3 and 5.

FIG. 3 illustrates that ply pre-defined pattern 41a (within a single ply layer 50) comprises a first sub-pattern 43, and a second sub-pattern 44.

FIG. 5 illustrates that pre-defined pattern 41b (across a plurality of ply layers) comprises a plurality of ply pre-defined patterns 41a.

It therefore follows that the pre-defined pattern 41b also comprises a first sub-pattern 43, and a second sub-pattern 44, as by suitable location and orientation of overlaying plies comprising ply pre-defined patterns 41a, a first sub-pattern 43 and/or second sub-pattern 44 may be produced that extends across adjacent ply layers 50.

In both orientations (within an individual ply, across multiple plies), the second sub-pattern 44 is superposed on the first sub-pattern 43.

The first sub-pattern 43 defines the desired crack propagation direction—i.e., the first sub-pattern 43 is aligned along the required alternative release plane 33a.

The second sub-pattern 44 meanders about the first sub-pattern 43. The separation of the adjacent localised weaknesses 42 of the second sub-pattern 44 defines the toughness and/or strength of the fan blade. In other words, the second sub-pattern 44 is configured to set a threshold below which the crack 40 does not propagate.

The combination of the first sub-pattern 43 and second sub-pattern 44 define the pre-defined fracture surface 33b for the fan blade 31 under impact conditions. The pre-defined fracture surface 33b may meander about the required alternative release plane 33a. For this reason, the pre-defined fracture surface 33b substantially corresponds to the alternative release plane 33a but is not identical to it.

Further features of the pre-defined fracture surface 33b are now disclosed.

The pre-defined fracture surface 33b may comprises an initiation region and a propagation region.

The pre-defined fracture surface 33b may also comprise a termination region.

Concerning the initiation region, it will be appreciated that it is not practicable to control the location at which a bird or group of flocking birds strike a rotating fan blade of a gas turbine engine.

It may also be appreciated that a crack 40, caused by an impact, has the potential to propagate in a direction that may be undesirable. For example, in the event of an impact towards the leading edge of the fan blade, a crack may propagate towards the interface between composite laminate 39 and, if present, towards fan blade leading edge reinforcement 37.

This may be undesirable because the mass of material released from the fan blade may become unpredictable, whilst a fracture surface may also propagate radially inboard along an interface between the composite laminate 39 and the fan blade leading edge reinforcement 37, towards a highly stressed area of the fan blade 31 such as the transition are between the fan blade and the fan root 34.

Localised damage to the fan blade may occur at the impact site of a foreign body, such as a bird, on a surface of a fan blade.

Depending upon where the impact site is on the fan blade 31, and the magnitude of the impulse provided to the fan blade by the impacting bird, a crack may initiate at the impact site and propagate across and through the fan blade 31. The impulse provided to the fan blade may also excite a modal response within the fan blade.

Alternatively or additionally, a crack 40 may initiate at a location on the fan blade where the modal response of the fan blade produces a region of strain that is sufficiently high to damage the composite. This location may be away from the impact site. For example, an impact proximal to the leading edge of the fan blade may initiate crack initiation at or towards the trailing edge of the blade, due to the modal response of the blade.

It will therefore be appreciated that in some circumstances, an impact on a fan blade may initiate a plurality of different cracks 40, each of which is at a different location on the fan blade, and each of which may or may not propagate through and across the fan blade.

The initiation region is therefore configured to direct a crack 40 from a crack initiation site to the propagation region. The initiation region therefore acts to funnel a crack that may initiate at any one of numerous potential locations at or close to the surface of the fan blade, towards the propagation region. The location of the initiation region within the laminate may be based at least on part on the at least one modal response of the fan blade. The initiation region may force a crack to initiate away from specific portions of the fan blade, such as the fan blade root or interface with leading edge or trailing edge reinforcement (if fitted).

The initiation region comprises a plurality of localised weaknesses 42 in the outer plies 50 of the fan blade 31.

In some, but not necessarily all embodiments, although the inner plies of the fan blade 31 comprise a plurality of localised weaknesses, the outermost plies, and specifically, the outermost ply do not comprise any localised weaknesses. This may be advantageous because by so doing, the likelihood of fatigue-induced cracking may be reduced.

The initiation region is configured to guide the crack 40 from an expected or desired crack initiation at or proximal to an outer surface of the fan blade, to the propagation region of the pre-defined fracture surface 33*b*. By so doing, the pattern of localised weaknesses within the initiation region also guides the crack 40 away from areas of the blade where greater variation in dispersion of the crack propagation may occur and/or more critical regions of the blade such as the fan root.

Whilst propagating within the initiation region, the crack may propagate through the outer layers of the fan blade to the propagation region that is inboard of the outer surface of the fan blade. The spatial distribution of the localised weaknesses in the initiation region is such that a crack may propagate in any one of, or combination of, a radial direction (R), a chordal direction (X) or through thickness direction of the fan blade (T), until the crack reaches the propagation region.

Once within the propagation region, the crack may propagate in a controlled manner, defined by a distribution of the localised weaknesses 42, along the chord of the blade and/or radial height of the blade and/or through-thickness of the blade.

As the crack propagates along a pre-defined fracture surface 33*b* within the propagation region the spatial distribution of the localised weaknesses of the plies in the propagation region may be less spatially-distributed than in the initiation region.

Although described above with reference to propagation of a single crack 40 along a single pre-defined fracture surface 33*b*, other possibilities are also envisaged.

For example, following initiation of the crack with the initiation region, the spatial distribution of localised weaknesses in the propagation region may be such that the pre-defined fracture surface 31*b* defined by the localised weaknesses has a branching pattern. That is, a single crack 40 may branch into a plurality of different spatially pre-defined and distributed cracks 40 within the laminate. This increases the energy absorbed during crack propagation and may reduce the impact damage caused by release of a portion of the fan blade. This is because the branching pattern may cause the released portion to split into a larger number of smaller portions, prior to impact with the surround fan containment system, thus increasing the area over which impact occurs, and reducing the average impact energy of each individual impact. Alternatively, the branching pattern may reduce the stiffness of the released portion, such that the peak impact energy during impact with the fan containment system is reduced.

In some but not necessarily all embodiments, the propagation region extends across the full chord of the fan blade and from an interfacing ply layer with the innermost ply layer of the initiation region, through the thickness of the fan blade to an outer ply layer of the fan blade on the surface of the fan blade that opposes the surface on which the impact occurs. Thus, propagation of a crack through the propagation region separates the blade into a radially outer portion that is released, and a radially inner portion that is retained by the fan disc.

The radially outer portion may be referred to as a first portion.

The radially inner portion may be referred to as a second portion.

In other embodiments, the propagation region may extend across a partial chord of the blade and/or may partially extend from the interfacing ply layer with the innermost ply layer of the initiation region, partially through the thickness of the fan blade, but not extending to the outer ply layer on the opposing surface of the fan blade to the impact site or the outermost ply layers on the opposing surface of the fan blade to the impact site. In these embodiments, partial propagation of the crack along the chord and/or thickness of the blade generates a region of weakness within the blade.

Partial cracking of the fan blade increases the mechanical loading on unbroken plies that are adjacent to and "ahead" of the crack as it propagates within the blade. As the ratio of the crack length to a characteristic length (for example, a chord length) of the blade increases, the direction of the ongoing propagating crack through the remaining unbroken plies becomes increasingly predictable. As this occurs, the effect of localised weaknesses in guiding crack propagation becomes less significant. Thus, in these embodiments, it is possible to not incorporate at least one localised weakness in these ply layers, yet not have a significant impact on the mass of the radially outer portion of the blade that is released.

Thus, without pre-defining a pattern of localised weaknesses 42 throughout the fan blade 31, it is possible to cause the fan blade 31 to fracture along a substantially pre-defined fracture surface 33*b*. This may be desirable, because each of the localised weaknesses on each ply is formed by a manufacturing operation.

By reducing the total number of localised weaknesses within the blade and/or the fraction of plies which comprise localised weaknesses, manufacturing operation, the time and/or cost taken to produce the fan blade may be reduced, without substantially influencing the mass of the released portion of the fan blade.

Alternatively, in other embodiments, if more precise control of the pre-defined fracture surface is required, the pre-defined fracture surface may additionally comprise a termination region. The termination region extends from the propagation region across the chord and/or thickness of the blade.

It will be understood from the above disclosure, that a crack, initiating at any location on the surface of a fan blade due to an impact event, may propagate along a pre-determined path through the blade, such that the blade may be separated in a controlled manner. Hence, by so doing, it may be ensured that the mass of the released blade portion is known, falling within defined tolerances.

The path of propagation of the crack 40 through the fan blade 31 is a first sub-pattern 43 of a pattern 41 of localised weaknesses 42. The pattern of localised weaknesses 42 are distributed throughout the fan blade 31.

The first sub-pattern 43 is configured to propagate the crack 40 to separate the kinetic energy absorptive composite article 31 in a controlled manner.

Control of the toughness of the blade, by a second sub-pattern 44 that is configured to increase an amount of energy absorbed by the propagation of the crack, is now disclosed.

As previously disclosed, it is necessary to ensure that the fan blade has some degree of damage tolerance, and does, for example, not fracture when subject to low levels of impact.

This is achieved by superposing a second sub-pattern 44 on the first sub-pattern 43.

Figure 7A:
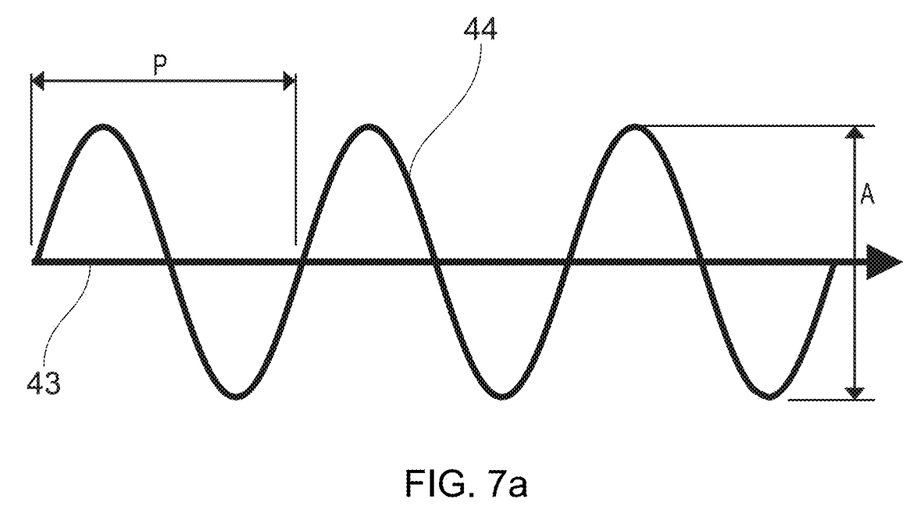
FIG. 7a shows the periodicity and amplitude of a crack defined by a first and second sub-pattern.

As illustrated in FIG. 7A, the second sub-pattern 44 may be periodic, in that it comprises a pattern that repeats about and along a centre-line defined by the first sub-pattern 43.

The second-sub-pattern 44 may be defined by a spatially-distributed arrangement of localised weaknesses 42 throughout the plies of the fan blade 31.

The periodicity, P, and amplitude, A of the periodic pattern may vary along the length of the first sub-pattern 41.

Periodicity P may be in the range of 0.1 millimetres to 5 millimetres.

Amplitude A may be in the range of 0.1 millimetres to 5 millimetres.

By altering the periodicity, P, and amplitude, A, it is possible to control the toughness of the fan blade 31—i.e., it is possible to control an impact threshold for the fan blade 31.

If the impact energy of an object is below the threshold, a crack will neither initiate nor propagate within the blade, due to the impact.

If the impact energy of an object is equal to or above the threshold, a crack will initiate and propagate within the blade, such that the crack propagates from the crack initiation site to the surface of the blade opposing the initiation site, and an outer portion of the blade is released.

Changing the periodicity P and/or amplitude A of the periodic pattern along the first sub-pattern 41 changes the localised toughness of the blade because these changes also change the separation distance between adjacent localised weaknesses.

For example, if the periodicity P of the second sub-pattern is increased, the separation between adjacent localised weaknesses (on different fibers of the same ply layer and/or different fibers of different ply layers) is increased, thus increasing the energy required to initiate or propagate a crack. For example, the separation between adjacent localised weaknesses may be separated by at least one ply layer which does not comprise a localised weakness. This promotes additional delamination at the interface between the ply layers, increasing energy absorption and increasing localised toughness.

Alternatively, if the periodicity P of the second sub-pattern is decreased, the separation between adjacent localised weaknesses is reduced, thus decreasing the energy required to initiate or propagate a crack.

Similarly, if the amplitude A of the second sub-pattern is increased, the separation between adjacent localised weaknesses (on different fibers of the same ply layer and/or different fibers of different ply layers) is increased, thus increasing the energy required to initiate or propagate a crack, whilst if the amplitude A of the second sub pattern is decreased, the separation between adjacent localised weaknesses is reduced, thus decreasing the energy required to initiate or propagate a crack.

Changing the amplitude A and or periodicity P of the crack therefore provides a means to control the energy absorbed during crack propagation whilst ensuring that the crack propagates in the desired, pre-defined direction.

For example, a smaller amplitude A and/or periodicity P pattern within the laminate may be initially used to ensure a crack propagates in a desired direction. Following establishment (initiation) of the crack, a larger amplitude A and/or periodicity P may then be used to increase energy absorption. If the crack then propagates within a portion of the laminate such that the local geometry increases the propensity of the crack to propagate in an unintended direction, then the amplitude A, and or periodicity P may be reduced to reduce this risk.

Thus, the amplitude A and/or periodicity P may be varied along the pre-defined pattern 41b to satisfy the competing goals of controlling the direction of crack propagation and increasing energy absorption during crack propagation.

Changing the periodicity, P and/or amplitude, A of the second sub-pattern 44 along the crack propagation path defined by the first sub-pattern 43 may also be desirable from an operational viewpoint of the fan 13 of the gas turbine engine 10.

From the above disclosure, it will be understood that localised damage may occur at an impact site on a surface of a fan blade, but that the energy imparted during the impact event may be insufficient to cause a crack to propagate throughout the blade. However, the impact damage to the fan may remain visible. Although it is possible to examine the internal state (presence of internal cracks) of a fan blade by various means, such as ultrasonic or X-ray inspection, it will be appreciated that these inspection means are time-consuming and require maintenance staff for their performance. These techniques therefore cannot be performed by the crew of an aircraft, prior to departure.

In some embodiments, the periodicity, P and/or amplitude, A of the second sub-pattern 44 may therefore be varied along the trajectory of crack propagation such that a crack may propagate more easily (requiring less energy) through the inner ply layers of the fan blade 31 than in the outer ply layers. For example, at least one of the periodicity P and amplitude A of the second-sub-pattern within the propagation zone may be smaller than in the initiation zone. Thus, once a crack propagates to the propagation zone, the crack propagates more easily, causing the release of an outer portion of the blade.

A potential advantage of this approach is that, by suitable selection of P and A throughout the blade, a simple visual inspection of the fan blade may be provided—i.e., although localised damage may be visible on the surface of the blade, the fact that the blade is otherwise intact (no portion of the blade has been lost) shows that the affected fan blade is suitable for at least short term operation, such that the aircraft may be scheduled to be inspected at an overhaul base, minimising operational disruption for the operator of the aircraft to which the gas turbine engine 10 is attached.

This may be particularly advantageous for a passenger carrying aircraft, as these aircraft are operated with a high degree of utilisation, making unplanned and unscheduled maintenance highly-disruptive to the operation of the aircraft.

Figure 7B:
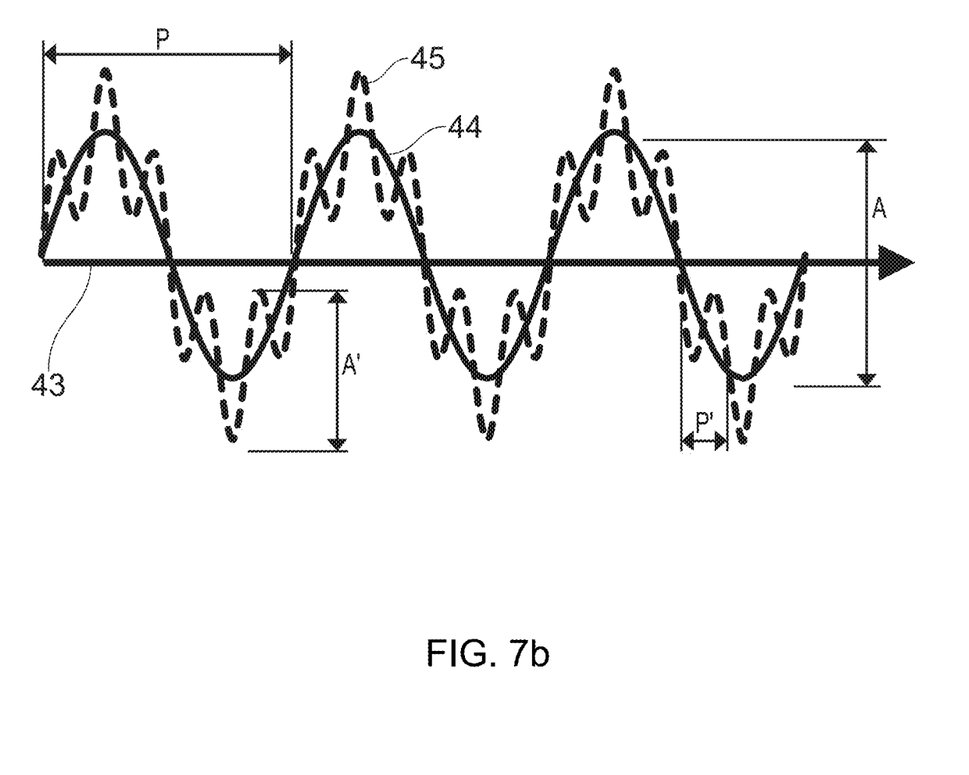
FIG. 7b shows the periodicity and amplitude of a crack defined by a first, second and third sub-pattern (FIG. 7b)

In some embodiments the pre-defined pattern 41 additionally comprises a third sub-pattern 45. The third sub-pattern 45 may be superposed on the second sub-pattern 44 and the first sub-pattern 43. An example of this is illustrated in FIG. 7B.

The third sub-pattern 45 may have a periodicity P' and an amplitude A'.

The periodicity, P', and amplitude, A' of the third sub-pattern may vary along the length of the first sub-pattern 43 and/or second sub-pattern 44.

A length-scale of the third sub-pattern 45 (if present) is smaller than a length scale of the second sub-pattern 44, i.e., P' is smaller than P and/or A' is smaller than A.

In embodiments which comprise the third sub-pattern 45, the third sub-pattern 45 may be discontinuous. That is, the third sub-pattern may only be present along a length of a portion of pre-defined pattern 41.

Incorporating a third sub-pattern 45 may be advantageous because it increases the total surface area of the crack to be formed, increasing the energy absorbed and/or providing further means to adjust the toughness of the laminate 39.

Further superposition, of progressively-smaller sub-patterns, having progressively smaller length scales, is also possible. Superposition of progressively-smaller sub patterns may be desirable because it may further increase energy dissipation during crack propagation.

Figure 8:
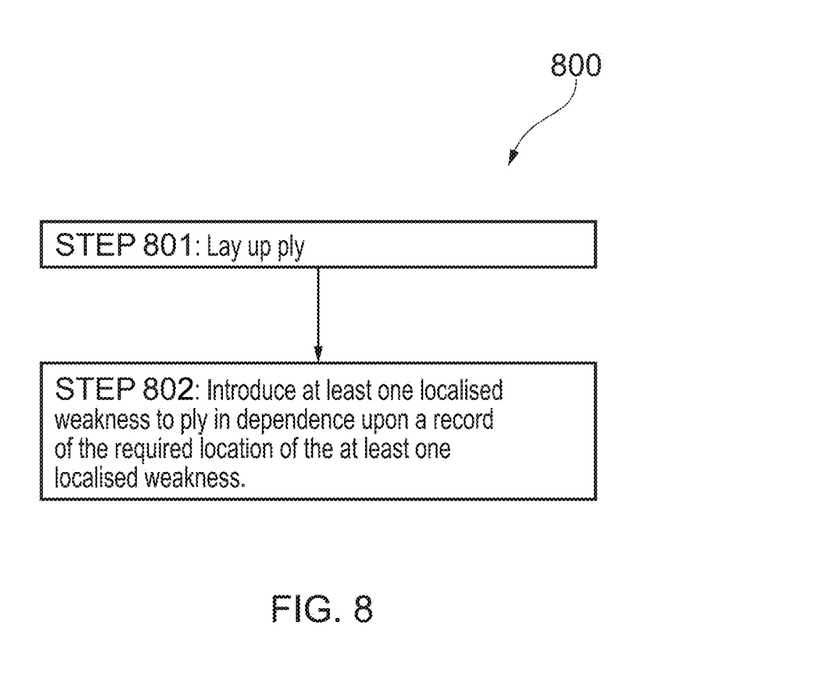
FIG. 8 is a flow chart of a method for manufacturing a kinetic energy absorptive composite article such that will fail in a controlled manner upon impact.

A method 800 for controlling the failure of a composite article (i.e., a fan blade), as a form of kinetic energy absorptive composite article, is also now disclosed in FIG. 8.

Prior to performing the method, a desired crack propagation surface is first determined. The desired crack propagation surface may separate the kinetic energy absorptive component into at least two parts. For example, the desired crack propagation surface may separate a fan blade 31 into a radially outer portion 31*a* and a radially inner portion 31*b*.

In embodiments in which the kinetic energy absorptive component is a fan blade 31, the desired crack propagation surface may be determined by consideration of the mass of the radially outer portion 31*a*, and as a consequence, the impact energy of the radially outer portion 31*a* on a fan containment system and/or a following blade 31, rotating about axis 11 as a component of fan 13.

The determination of the desired crack propagation surface may be conducted as part of a design optimisation exercise for the gas turbine engine 10.

Impact analysis, for example, using finite element techniques, may be performed to determine the desired crack propagation surface. In this, an impact analysis of the response of the fan blade to an impact by a foreign body, such as a bird, is performed. The impact analysis may determine a response of the blade to the impact, i.e., the impact analysis may determine a modal shape of the blade. The impact analysis may consider a range of different impact energies (i.e., different masses of foreign body), impacting at different locations (variations in blade chord and/or radius).

Once the required pre-defined fracture surface 33*b* corresponding to a required alternative release plane 33*a* has been determined, a pattern 41*b* of localised weaknesses 42 that are configured to cause fracture along this surface are determined. The pattern 41*b* of localised weaknesses 42 comprise the first sub-pattern 43 and second sub-pattern 44, as previously disclosed. The pattern 41 may optionally comprise the third sub-pattern 45 and/or further sub-patterns of progressively smaller length scale superposed on the first sub-pattern 43 and second sub-pattern 44.

The pattern 41*b* of localised weaknesses is spatially distributed within the ply layers of the laminate 39 that forms the kinetic energy absorptive composite article 31.

From pattern 41*b*, a ply-specific pattern (a ply pre-defined pattern) 41*a* is then determined for each ply 50 that comprises at least one localised weakness 42.

The required ply, location, orientation and/or size of each of the localised weaknesses 42 in the composite article is then recorded. The record may be made, for example in a ply-book or an addendum to a ply-book.

Once the ply, location, orientation and/or size of each of the localised weaknesses desired localised weaknesses 42 have been recorded, the method 800 may be performed.

At step 801, a ply is laid down.

The plies may be of any suitable type. For example, the plies may be "pre-preg" plies, comprising at least one layer of pre-impregnated fiber within a partially cured polymer matrix.

Each ply is laid individually, with successive plies added sequentially to form the finished laminate.

If the ply that is laid down is to comprise at least one localised weakness, the at least one localised weakness is made to the ply before the subsequent ply is overlaid. Determination of whether at least one localised weakness is to be introduced to a ply may be made in dependence upon consulting a record, for example, in dependence upon a ply-book.

At step 802, at least one localised weakness may be introduced to the ply that has been laid down. The at least one localised weakness may be introduced to form a portion of the pre-defined pattern 41. It will be appreciated from the preceding disclosure that according to which ply is laid down, no localised weakness 42 may be introduced to a specific ply layer, or at least one localised weakness 42 may be introduced.

The at least one localised weakness may be introduced (created) within the ply layer by a variety of means. For example, introducing the localised weakness may comprise severing or partially severing a single fiber or grouping of adjacent fibers of a ply.

Alternatively, introducing the localised weakness may comprise severing fibers of adjacent layers simultaneously.

The localised weaknesses within the laminate may therefore be of different sizes.

The length of the localised weaknesses may be in the range of 10 to 50 microns.

Severing may be performed by a cutting process, such as mechanical cutting with a blade or machine tool, or laser cutting. Alternatively, the localised weakness may be formed by a spray process, in which a chemical is locally applied to the ply. The chemical applied may be PTFE.

In some but not necessarily all embodiments, the severing means (for example, blade, machine tool, laser cutting head and/or spray head) may be comprised within a ply-layup tool. For example, lay-up of the sequential ply layers may comprise application of a roller, to provide pressure on the ply being laid, such that the pre-preg ply adheres to the pre-preg layer beneath it, and that air-bubbles that would otherwise be trapped between the layers, are removed. The roller may be comprised within a ply-layup tool, mounted to the head of a robotic arm.

In these embodiments, translation and rotation of the head of the robotic arm may be controlled in up to 6 degrees of freedom (three-dimensional translation of the head, rotation of the head about up to three orthogonal axes of rotation). Thus, the location and orientation of the ply-layup tool mounted to the head of the robotic arm may be controlled. By comprising the severing means within the ply-layup tool, the location and orientation of the severing means are therefore also known. The localised weaknesses in each ply layer than comprises at least one weakness, may therefore be accurately made.

Once all localised weaknesses in a ply layer that comprises a localised weakness have been made, the next ply layer may be laid, and localised weaknesses added (if appropriate).

By sequentially laying down ply layers and severing or partially severing a single fiber or grouping of adjacent fibers of a ply, a three-dimensional pre-defined pattern 41b of localised weaknesses 42 may be formed throughout the laminate 39 of the fan blade 31.

This three-dimensional pattern extends through at least a portion of the fan blade 31.

It will be understood that the invention is not limited to the examples above described and various modifications and improvements can be made without departing from the concepts described herein.

For example a kinetic energy absorptive composite article such as a fan blade may comprise a plurality of different pre-defined patterns 41a 41b, each of which is configured to direct a different crack in a different direction.

In these embodiments, rather than separating the fan blade into a radially outer portion (first portion) 31a and a radially outer portion (second portion) 31b, the fan blade may be separated into a plurality (multitude) of smaller portions. The fan blade 31 may thus be described as frangible.

This may be advantageous because this disintegration of outer portions of the fan blade may reduce the mass of each released portion of the fan blade and/or may disperse the released portions, causing them to impact the surrounding fan case over a wider area. This may have beneficial effects in permitting a lighter-weight fan containment system to be used.

Similarly, method steps 801 and 802 may be reversed. That is, localised weaknesses may be introduced to a ply, prior to the ply being laid up on an adjacent ply during the manufacture of the kinetic energy absorptive composite article.

Except where mutually exclusive, any of the features may be employed separately or in combination with any other features and the disclosure extends to and includes all combinations and sub-combinations of one or more features described herein.

We claim:

1. A kinetic energy absorptive composite article comprising:
   a plurality of plies, each ply comprising a plurality of substantially parallel fibers; and
   a resin encapsulating the plurality of fibers;
   wherein a plurality of localised weaknesses are comprised within the fibers, the locations of the plurality of localised weaknesses forming a pre-defined pattern around at least one alternative release plane;
   the pre-defined pattern comprises a first sub-pattern and a second sub-pattern superposed upon the first sub-pattern;
   wherein the second sub-pattern is a periodic pattern;
   wherein at least one of a periodicity or an amplitude of the periodic pattern varies along a length of the first sub-pattern; and
   the first sub-pattern is configured so that a crack formed by an impact event propagates substantially along a pre-determined fracture path to separate the kinetic energy absorptive composite article into at least a first portion and a second portion and the second sub-pattern is configured to set a threshold below which the crack does not propagate.

2. The kinetic energy absorptive composite article of claim 1, wherein propagation of the crack does not occur below the threshold.

3. The kinetic energy absorptive composite article of claim 1, wherein the first sub-pattern and the second sub-pattern extend away from a surface of the kinetic energy absorptive composite article at which the impact event occurs.

4. The kinetic energy absorptive composite article of claim 1, wherein the pre-determined fracture path substantially determines a mass defined by the radially outer portion of the kinetic energy absorptive composite article.

5. The kinetic energy absorptive composite article of claim 1, wherein the pre-defined pattern comprises a third sub-pattern that is superposed on the first sub-pattern and the second sub-pattern, and the third sub-pattern is periodic having a second periodicity and a second amplitude.

6. The kinetic energy absorptive composite article of claim 5, wherein: the magnitude of the second periodicity is smaller than the magnitude of the periodicity.

7. The kinetic energy absorptive composite article of claim 5, wherein: the magnitude of the second amplitude is smaller than the magnitude of the amplitude.

8. The kinetic energy absorptive composite article of claim 1, wherein the pre-defined pattern comprising the localised weaknesses comprises a plurality of plies comprising at least one localised weakness and a plurality of plies that do not comprise at least one localised weakness, and the plurality of plies comprising at least one weakness are interleaved with the plurality of plies that do not comprise at least one localised weakness.

9. The kinetic energy absorptive composite article of claim 5, wherein the second sub-pattern or the third sub-pattern promotes at least one of a delamination between adjacent plies or promotes breakage of fibers of the plies.

10. The kinetic energy absorptive composite article of claim 1, wherein the localised weakness within the plies comprises at least one of a localised reduction in a cross-sectional area of a fiber of the plies or a localised reduction in the breaking strength of a fiber of the plies.

11. The kinetic energy absorptive composite article of claim 10, wherein the localised reduction in the cross-sectional area of the fiber is formed by a cutting process.

12. The kinetic energy absorptive composite article of claim 10, wherein the localised reduction in the breaking strength of the fiber is formed by application of a chemical to the fiber.

13. The kinetic energy absorptive composite article of claim 1, wherein the kinetic energy absorptive composite article is a gas turbine engine fan blade.

14. A gas turbine engine including a kinetic energy absorptive composite article of claim 1.

15. The gas turbine engine of claim 14, where the kinetic energy absorptive composite article is a fan blade.

* * * * *